Sept. 26, 1939.  H. G. MOW  2,174,008
DISTILLATION OF AMINES FROM REDUCTION MASSES
Filed Jan. 29, 1938
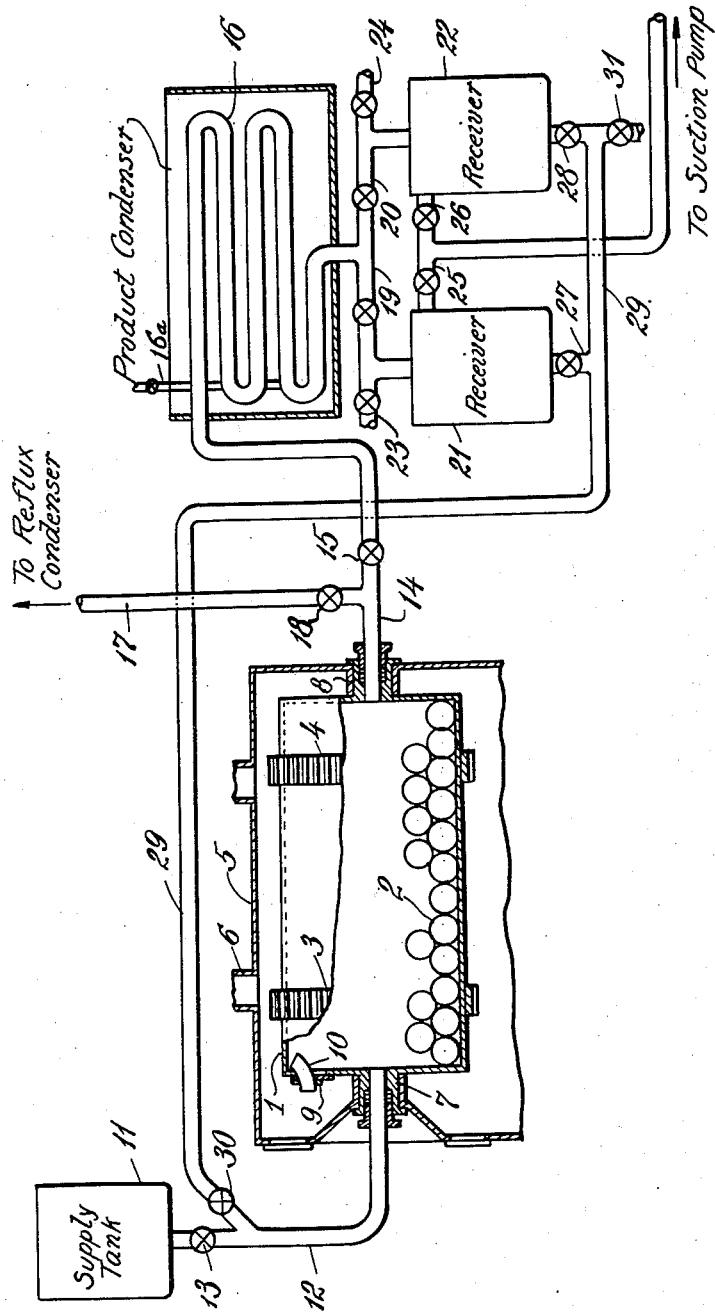
INVENTOR
Harold G. Mow
BY
ATTORNEY Patented Sept. 26, 1939

2,174,008

UNITED STATES PATENT OFFICE 2,174,008

DISTILLATION OF AMINES FROM REDUCTION MASSES

Harold G. Mow, Buffalo, N. Y., assignor to National Aniline and Chemical Company, New York, N. Y., a corporation of New York Application January 29, 1938, Serial No. 187,757

5 Claims. (Cl. 202—65)

This invention relates to the recovery of aromatic amines from reduction masses obtained by reducing nitrogen compounds of a higher state of oxidation by means of reducing metals.

In the reduction of aromatic nitrogen compounds such as the nitro-, nitroso-, azoxy-, azo-, and hydrazo-compounds, the nitrogen compound is reacted with a reducing metal in the presence of an aqueous solution of a relatively small amount of an electrolyte such as hydrochloric acid, sulfuric acid, acetic acid, ferrous chloride, or the like. In such processes by virtue of the insufficient amount of the "acid" ion in the aqueous solution to bind as a metal salt all the reducing metal, the portion of the latter effecting the reduction is converted chiefly to an oxide or hydroxide. Thus iron may be converted to $Fe_3O_4$; similarly zinc and tin may yield the corresponding oxides, or hydroxides, or mixtures of oxides and hydroxides. These oxide reaction products are in the form of finely divided particles which are in large part dispersed throughout the liquid phases of the reaction mass and form therewith a more or less pasty mass from which separation of the desired amine product by filtration or decantation is accomplished, if at all, with great difficulty and with losses of valuable material. The amines can be recovered from such reaction masses by distillation but distillation results in progressive thickening of the pasty reduction masses as the more liquid constituents are evaporated therefrom. Because of the physical nature of the material, there are no convection currents to maintain uniform temperatures in the pasty masses; stirring thereof by ordinary means requires increasing and costly input of power and even then is not satisfactory, while lack of efficient transfer of heat throughout the masses causes considerable porportions of the distilled material to become overheated and decomposed. Although the reduction mass may be fairly fluid as the result of its water content, the water is more volatile than the amine; accordingly water is substantially the first constituent of the distilland to be removed and does not serve to provide fluidity during distillation of the bulk of the amine from the mass.

In accordance with the present invention I have found that such reaction masses may be distilled easily and efficiently in a still comprising a ball mill; that is a vessel of cylindrical form which is rotatable about a non-vertical, preferably approximately horizontal axis and is provided with loose, ponderous elements which are free to move and to agitate material in the vessel as the latter is caused to rotate. I have found the loose agitator elements to be effective stirring devices and efficient aids for minimizing and reducing local overheating of the mass and losses due to thermal decomposition of the amine products. Moreover, by employing a still of this type I have found that the distillation time may be cut to a period which is from about one-third to about one-fourth of that formerly required, without reducing the other advantages obtainable by the process.

To further minimize decomposition of the amine, the distillation may be conducted in vacuo with gradually decreasing absolute pressure and is preferably finished at an absolute pressure of about 2 inches of mercury.

An apparatus suitable for conducting my process is illustrated more or less diagrammatically in the accompanying drawing, wherein—

Numeral 1 designates a ball mill containing balls 2. The mill and balls may be constructed of iron or steel or a corrosion resistant alloy. Balls of solid iron between 6 inches and 8 inches in diameter are suitable. The mill, mounted approximately horizontally on ring gears 3 and 4, is disposed within a heating chamber or oven 5 heated, for instance, by hot combustion gases passing up through the oven, around the mill, and out through ports 6.

The mill 1 has hollow trunnions 7 and 8 suitably packed, providing a liquid inlet and vapor outlet therefor. It also has a cover-plate 9 provided with a removable leg 10. When the mill is in the position illustrated, the cover-plate may be removed for introducing solid or liquid material to the mill or for inserting or removing leg 10. The latter is for removal of liquids from the mill and may be arranged to connect directly with a conduit (not shown) leading to disposal means. However, to avoid injury by the balls, it should be removed before starting the mill.

A supply tank 11 is connected through trunnion 7 to the mill by conduit 12 having a valve 13. A conduit 14 having a valve 15 leads from the mill via trunnion 8 to product condenser 16, which may have a vent 16a to assist drainage. A branch conduit 17 with valve 18 connecting with a reflux condenser (not shown) may be provided if the apparatus is to be used for the reduction as well as for distillation of the reduction mass.

Condenser 16 is connected by valve-controlled conduits 19 and 20 to receiving tanks 21 and 22. Either or both of these tanks may be steam-jacketed to maintain normally solid products in liquid phase. Valved branch conduits 23 and 24 provide access to the atmosphere. From near the tops of tanks 21 and 22, valve-controlled outlet conduits 25 and 26 lead to a suction pump (not shown). At the bottom of the tanks, outlets 27 and 28 are connected to a return line 29 provided with valve 30, and to product outlet 31. Entirely separate product outlets from tanks 21 and 22 may be provided if desired.

Although the apparatus described may be used for the reduction as well as the final distillation of reduction products, and in certain of the examples the reduction process as well as the distillation process is described, it should be borne in mind that it is not essential to carry out the reduction process in the ball mill and that the reduction mass may be introduced into the ball mill after the reduction has been completed in other similar or dissimilar apparatus and before or after partial evaporation of the product therefrom.

The process of the present invention may be carried out in the apparatus illustrated in the following manner:

With valve 15 and the valves on conduits 19, 23, and 25 open and the remaining valves of the system closed, valve 13 is opened to admit the initial material from supply tank 11. The initial material in the case of aniline for example may consist of aniline, water, ferric oxide in suspension, dissolved ferrous chloride, and finely divided metallic iron. When the level of the liquid in mill 1 has reached a point a little below conduits 12 and 14, valve 13 and the valve on conduit 23 are closed. The suction pump is started and hot gases are allowed to pass up around the mill to heat the contents thereof to distillation temperature. At the same time the motor is started to rotate the mill at a rate on the order of 8 R. P. M. Prior to such operation the leg 10 should be removed in order to avoid injury thereto by the balls 2. Cooling fluid may be circulated in contact with or sprayed upon the coils of condenser 16 to cool the vapors in these coils.

During the early part of the distillation, water along with a relatively small proportion of aniline is vaporized in the mill and condensed in condenser 16 from which the condensate flows into receiving tank 21. When substantially all of the water has been distilled off in this manner, the valves on conduits 19 and 25 are closed and the valves on conduits 20 and 26 are opened so that from this point on distillate is recovered in receiver 22.

As the distillation proceeds, the mixture in mill 1 acquires a more and more pasty character but is prevented from forming a difficulty distillable mass by balls 2 which serve to spread the paste more or less uniformly along the walls of the mill and to work the paste so that it is relatively uniformly heated. The distillation is continued until substantially all of the aniline has been distilled from the mill 1. Then the valves on conduits 20 and 26 may be closed and valves on conduit 23 opened to bring the internal pressure of the system to atmospheric.

With the mill in the position illustrated, leg 10 may be placed on cover-plate 9, and after the temperature of the mill has dropped to around 100° C. if desired, water may be introduced either from supply tank 11 or by means of leg 10, to moisten the contents of the mill. The mill may be rotated for a short period to permit this water to flush the walls thereof and mix with the solid residue therein. The rotation of the mill is then stopped in a postion such that leg 10 is at the bottom thereof and the leg is connected to suitable disposal means for the water employed in the flushing operation. This water may be removed either by the application of suction from such means or by increase in pressure applied in any suitable manner as by means of a suitable pressure connection (not shown) connecting with branch conduit 23. When the mill has been suitably washed out, the conduit connected with leg 10 may be disconnected and the leg may be removed from the cover-plate which then may be suitably plugged.

Any undissolved aniline in receiving tank 21 may be withdrawn from beneath the water via outlet 31. The aqueous liquid in receiver 21 contains some dissolved aniline and the aniline may be recovered therefrom in any suitable manner. If the ball mill is employed for effecting reduction as well as for distillation of the reduction mass, the valve on outlet 27 and valve 30 may be opened and the suction pump started so as to draw the liquid from receiver 21 through pipes 29 and 12 into the mill where it may be employed as the aqueous liquid in the treatment of a succeeding batch.

The following examples illustrate the conduct of reduction and distillation from the same mill. Similar distillation conditions are applicable, however, whether the mill is employed for both steps or merely for the distillation step.

EXAMPLE 1.—ALPHA-NAPHTHYLAMINE

*Reduction*

2800 parts of swarf, 130 parts of an aqueous 35% ferrous chloride solution, and 600 parts of water are charged to mill 1. After introduction of the swarf, ferrous chloride, and water, the mill may be rotated at about 8 R. P. M. and heated externally until the liquid charge reaches its boiling point. During this stage, valve 18 is open and valve 15 is closed. Heating is regulated so as to supply steady boiling, condensate from the reflux condenser being returned via vapor conduits 17 and 14 to the mill. 3350 parts of molten alpha-nitronaphthalene are fed gradually from supply tank 11 through pipe 12 to the mill, the rate of feeding being maintained by suitable adjustment of valve 13 so that the reaction generates sufficient heat to cause vigorous but not excessive refluxing without application of external heat to the mill. When all of the nitronaphthalene has been charged to the mill, valve 13 is closed and the mill is rotated until the reduction is complete as indicated by a test on a sample of the charge, which may be withdrawn by loosening the plug in cover-plate 9. Valve 18 is then closed.

*Distillation*

With the mill rotating as in the reduction step, valve 15 and the valves on conduits 19 and 25 are opened, the remaining valves of the system being closed, and the suction pump is started to reduce the internal pressure in the system. Heat is then applied to the mill to effect distillation of the volatile contents thereof. The first fraction of the distillate is chiefly water containing relatively small amounts of organic impurities, for example naphthalene. As the water distills off the pressure is reduced until at the point where the water and impurities cease to distill the absolute pressure is about 20 inches of mercury. There is a distinct interval required to raise the temperature to the boiling point of the alpha-naphthylamine therein during which the pressure is reduced to about 10 inches. When this break in the distillation occurs, the valves on conduits 19 and 25 are closed and the valves on conduits 20 and 26 are opened. The distillation is continued until no further condensate comes over at a final distillation pressure of about 2 inches of mercury absolute. When the distillation is completed, the mill is allowed to cool, leg 10 is replaced, and sufficient water is introduced through leg 10 to form a sludge with the iron oxide present. The iron oxide sludge is then sucked or blown out through leg 10.

The water which was distilled as the initial fraction recovered in receiver 21 can be conducted via pipes 29 and 12 back to the mill and used for the next reduction batch.

The amount of alpha-naphthylamine recovered by the above process is about 93% of the possible theoretical yield. It has a setting point between 45.5° C. and 48° C. and is sufficiently pure, without further refining treatments, for the manufacture of dyestuffs and dyestuff intermediates.

EXAMPLE 2.—ANILINE

Reduction

A vat is charged with about 56 parts iron, 121 parts aqueous 32% (20° Bé.) hydrochloric acid solution and 29 parts water. After a period of 4 to 6 hours, the faintly acid or neutral ferrous chloride solution is charged to a reducing mill of the type used in Example 1. 3800 parts iron borings (20 mesh) and 850 parts water also are charged thereto. The mill is connected with its reflux condenser, and its contents are heated to the refluxing temperature. 3000 parts of nitrobenzene are then run into the heated rotating mill at such a rate that the heat of reaction is sufficient to keep the reacting mass constantly at the refluxing temperature. After all the nitrobenzene has been added, the reaction mass is heated by external means until the reduction is complete. 41 parts of hydrated lime are then added to the mass, which is heated again to refluxing temperature for about 15 minutes. The mill is then shut off from the reflux condenser and connected with the distillation condenser.

Distillation

The batch in the rotating mill is boiled to distill off all water, which is condensed and run to one of the provided receivers. Then the mill contents are heated to about 175° C. while the system is gradually evacuated, and the aniline is distilled off in vacuo with gradually decreasing pressure at a rate of about 400 to 500 parts per hour, and run to appropriate receivers. The distillation is considered ended when no more aniline distills over at 175° C. at an absolute pressure corresponding to about one to two inches of mercury.

The mill is then cooled by external means to about 100° C., filled with water, and the resulting aqueous iron oxide slurry formed in the mill is blown out. The mill is rinsed in the same manner, and is made ready for a fresh operation.

The aniline water is used as charging water for the next batch. The aniline oil is withdrawn to suitable storage. It is a high grade product suitable for most technical purposes, and is readily rectified to produce water-white oil. The average yield of aniline is about 97 per cent of that theoretically possible from the charge of nitrobenzene reduced.

EXAMPLE 3.—META-PHENYLENE-DIAMINE

Reduction

The mill is charged with 3500 parts iron borings (20 mesh), 1500 parts water, and 30 parts of aqueous 70% acetic acid solution. With valve 18 open and valve 15 closed the mixture is heated in the rotating mill to its refluxing temperature. 1760 parts of meta-dinitrobenzene are introduced into the mill slowly and at a rate to maintain refluxing by heat of reaction. After the reduction is complete, 26 parts of lime are added to the mass.

Distillation

Valve 18 is closed, valve 15 is opened to connect the mill with condenser 16, and the receiving system is regulated as discussed in Example 1, suction being applied to maintain a gradually increasing vacuum in the mill until at the end of the distillation the absolute pressure corresponds to around 1 inch of mercury. When the distillation is complete, the iron oxide in the mill, as in the previous examples, is slurried with water and blown out of the mill.

The meta-phenylene-diamine thus obtained is an almost colorless crystalline mass, and has a solidifying point of about 62.6° C. Yield is equivalent to about 93 per cent of the theoretically possible figure based on the amount of dinitrobenzene treated.

In the process of Example 3, 1910 parts metadinitrotoluene may be reduced in place of the dinitrobenzene, and a yield equivalent to 93 per cent of the theoretically possible yield can be obtained. The meta-tolylene-diamine can be maintained as a liquid in the receiver and when the distillation is finished, the diamine can be run to a flaker and finished off as a dry, flaky product having a solidifying point of about 98° C.

I claim:

1. The method of separating an aromatic amine from a pasty mixture thereof with iron oxide formed by reducing a nitro-aromatic compound with iron in the presence of aqueous ferrous chloride, which comprises heating the mixture at an absolute pressure below 10 inches of mercury in a rotary mill to distill off the amine and simultaneously subjecting the mixture to the action of freely movable, ponderous agitators.

2. The method of separating aniline from a pasty mixture thereof with iron oxide formed by reducing nitrobenzene with iron in the presence of aqueous ferrous chloride, which comprises heating the mixture at an absolute pressure below 10 inches of mercury in a rotary mill to distill off the aniline and simultaneously subjecting the mixture to the action of freely movable, ponderous agitators.

3. The method of separating alpha-naphthylamine from a pasty mixture thereof with iron oxide formed by reducing alpha-nitronaphthalene with iron in the presence of aqueous ferrous chloride, which comprises heating the mixture at an absolute pressure below 10 inches of mercury in a rotary mill to distill off the alpha-naphthylamine and simultaneously subjecting the mixture to the action of freely movable, ponderous agitators.

4. The method of separating meta-phenylene-diamine from a pasty mixture thereof with iron oxide formed by reducing meta-dinitrobenzene with iron in the presence of aqueous ferrous chloride, which comprises heating the mixture at an absolute pressure below 10 inches of mercury in a rotary mill to distill off the meta-phenylenediamine and simultaneously subjecting the mixture to the action of freely movable, ponderous agitators.

5. The method of separating an aromatic amine from a pasty mixture thereof with metal oxide reaction products formed by reducing, in aqueous acid solution with a metal of the group consisting of zinc, tin, and iron, an aromatic compound containing nitrogen in a state of oxidation higher than aminic nitrogen, which method comprises heating the mixture at an absolute pressure below 10 inches of mercury in a rotary mill to distill off the amine and simultaneously subjecting the mixture to the action of freely movable, ponderous agitators.

HAROLD G. MOW.